Dec. 15, 1953 M. W. TALBERT 2,662,824
PROCESS OF TREATING APPLE SECTIONS
Filed Oct. 4, 1949
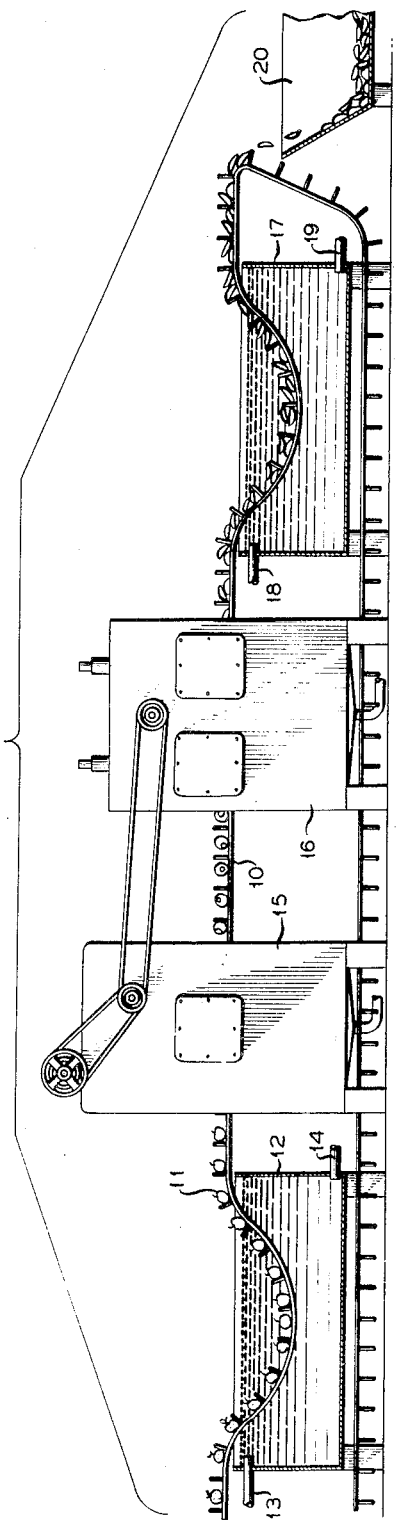
FIG. 1
FIG. 1a
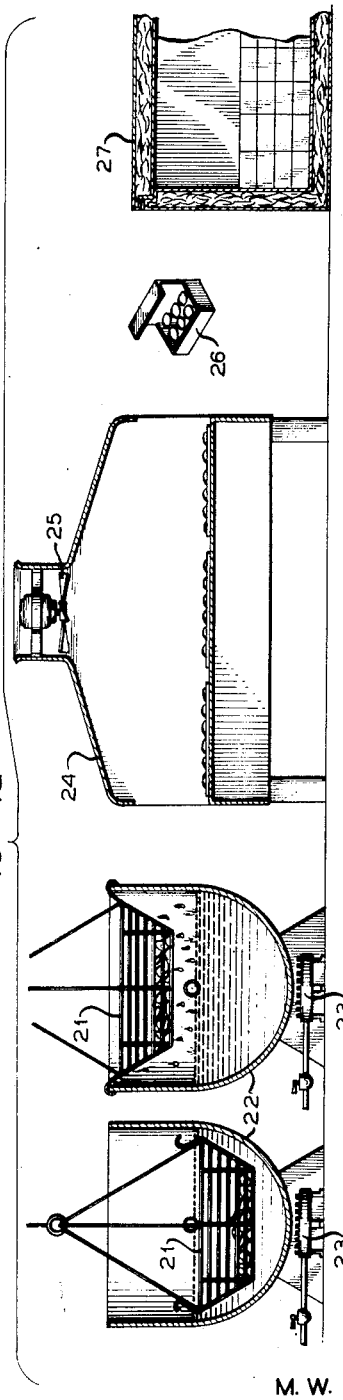
FIG. 2
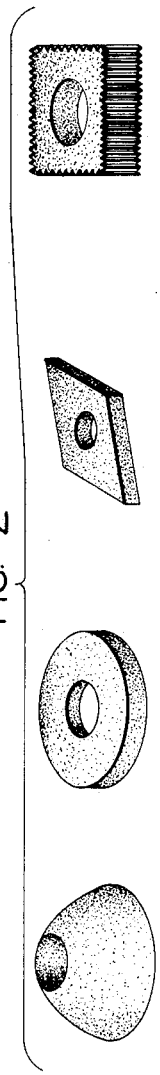
INVENTOR.
M. W. TALBERT
BY
A. Yates Dowell
ATTORNEY Patented Dec. 15, 1953

2,662,824

UNITED STATES PATENT OFFICE 2,662,824

PROCESS OF TREATING APPLE SECTIONS

Mary W. Talbert, Columbia, Mo.

Application October 4, 1949, Serial No. 119,506

1 Claim. (Cl. 99—193)

This invention relates to food and more particularly to a process for preserving fruit of the pomes family, particularly apples and vegetables of similar cellular structure. Through the use of the process relatively small portions of apples and the like may be preserved without deleterious effect for an indefinite time and the resulting product has a particularly appealing taste.

Heretofore apples and other fruit and vegetables have been prepared in many ways including the making of applesauce, the slicing into rings or sections for pies, salads, for frying, and the like. In addition, the preservation of apple sections and the like has been limited due to the fact that apples deteriorate rapidly, particularly when the skin is removed unless they are thoroughly cooked prior to storage. However, if a section or segment is subjected to thorough cooking its cellular structure becomes broken down mechanically, similar to that of applesauce and hence the retention of the shape or form of the segment is lost.

Accordingly, it is an object of the present invention to provide a method of thoroughly precooking apples or the like either whole or in small sections or segments such as rings, and balls, for use as a food, such that the cellular structure is broken down and is replaced by a jellied substance thus allowing the product ot retain its shape.

It is a further object of the present invention to provide a process for preserving fruit and particularly apples which enables them to be kept for a long period of time without deterioration in a natural or frozen state.

It is a further object of the invention to provide a thoroughly cooked, ready to serve, food product which is thoroughly cooked, retains its shape, and which is ready for consumption without further preparation.

The whole apple or other fruit is first washed to remove dust and dirt, then it is peeled and cored. The inside meat section is then sliced or cut into the desired sizes and shapes and bleached to remove any dark spots, markings or other discoloration and to prevent further discoloration. A sulphurous acid bath is commonly employed for this purpose. The segments are then placed in a basket and immersed in a boiling solution of water, sugar, and gelatin. The solution is preferably made up of the following substances in percentages by volume:

| | Per cent |
|---|---|
| Sugar | 33 |
| Water | 66 |
| Gelatin | 1 |

Depending on the segment size, the fruit is allowed to boil from ten to thirty minutes. A whole apple, or other fruit, requires approximately thirty minutes, a half apple twenty minutes, and smaller sizes proportionately less time. After boiling, the apples or other fruit, are removed and allowed to drain thoroughly and are then cooled to permit jelling.

In the cooled state, and after the product has set enough to permit handling, the jelled product may be chilled to produce a firmer set, or, if desired, the product may be frozen for storage to preserve it indefinitely.

It is understood that the food may be prepared in any shape desired and that vegetable coloring may be employed in the boiling process for decorative purposes. The food may be eaten as a sweet or may be used in salads, desserts, pies, pastries, and the like.

In order to more clearly set forth one specific method of manufacturing the food, reference is made to the accompanying drawing, wherein:

Fig. 1 represents schematically and in a general way apparatus which may be employed in carrying out the process;

Fig. 1a, a continuation of Fig. 1; and,

Fig. 2 illustrates a few of the shapes in which the food product may be produced.

With continued reference to the drawings one method of preparing the food product is disclosed, the apparatus including a suitably driven endless conveyor belt 10 manufactured of acid resistant material for moving fruit 11 continuously through the preliminary steps of the process.

A washing vat 12 is provided for cleaning the apple and has an inlet 13 and an outlet 14 which permits continuous changing of the cleansing agent. From the washing vat the fruit is conveyed to the peeling and coring machine 15 where the skin and core, if any, are removed.

From the machine 15 the conveyor belt 10 moves the skinned and cored fruit to the cutting machine 16, where the fruit is sliced into suitable shapes or segments such as those shown in Fig. 2.

The segments are then immersed in a conventional bleaching bath retained in an acid resistant vat 17 which is provided with an inlet 18 and an outlet 19. The bleaching removes dark spots and markings and prevents further discoloration of the sections. From the bleaching bath the segments are deposited in the collection bin 20.

In Fig. 1a, the boiling process is illustrated in which the sections are suspended by means of a wire basket 21 in the boiling vat 22. In the vat a solution of water, sugar, and gelatin of the desired quantity, in addition to coloring if desired, is kept continually boiling by the application of heat, gas burners 23 being provided for this purpose.

During boiling, the cellular structure of the fruit is broken down and replaced by a heterogeneous translucent mass of fruit and jelly solution, the latter being distributed throughout the fruit. After draining, the food product jells on cooling so that it may be handled and will retain its shape at temperatures below approximately 150° F.

The food product is next placed in a cooling and setting chamber 24 where circulation of air is provided by means of an electric fan 25 in order to promote cooling of the food product. Chilling of the chamber may be required, depending on the ambient temperature.

The resultant food product is then placed in receptacles 26 for storage in the freezing compartment 27 for quick freezing of the food product.

It will be apparent from the above that the invention contemplates a process by means of which various fruits and vegetables, and more particularly apples, may be prepared for use as a sweet, for salads and desserts, and for use in pies and the like, and may be stored indefinitely, either frozen, or for somewhat shorter periods in an unfrozen state. The product is thoroughly cooked and therefore more easily digested than raw fruit and is readily adapted for packaging for sale through retail outlets which may handle it without the need for expensive apparatus. It may be carried out to the home by the individual consumer and is the only ready cooked apple marketed as a frozen food free of surplus liquid.

It is understood that vegetables as well as fruit may be preserved in this same manner.

It will be obvious to those skilled in the art that various changes may be made in the invention without departing from the spirit and scope of the invention and therefore the invention is not limited by that which is shown in the drawings or described in the specification but only as shown in the appended claim.

What is claimed:

A process for producing a food product from apples, comprising the steps of washing, peeling, coring, and slicing the apples into sections, subjecting the apple sections to a sulphurous acid bath in order to bleach the same and to remove any dark spots therefrom, boiling the bleached apple sections for approximately ten to thirty minutes in a solution consisting of approximately sixty-six parts water, thirty-three parts sugar and one part gelatin to cook the sections and impregnate them with the solution, removing the sections from the solution, cooling the sections, packaging the cooked sections, and subjecting the packaged sections to refrigeration to further lower their temperature and assist in their preservation.

MARY W. TALBERT.

References Cited in the file of this patent

UNITED STATES PATENTS

| Number | Name | Date |
|---|---|---|
| 1,631,017 | Crawford | May 31, 1927 |
| 2,021,665 | Malmquist | Nov. 19, 1935 |
| 2,137,205 | Cowgill | Nov. 15, 1938 |
| 2,353,251 | Le Gloahec | July 11, 1944 |
| 2,563,996 | Edgar et al. | Aug. 14, 1951 |